UNITED STATES PATENT OFFICE.

JAMES HOAGLAND AND ISAAC C. McDONALD, OF COLUMBUS, OHIO.

IMPROVEMENT IN THE MANUFACTURE OF SOAP.

Specification forming part of Letters Patent No. 111,454, dated January 31, 1871.

*To all whom it may concern:*

Be it known that we, JAMES HOAGLAND and ISAAC C. McDONALD, of Columbus, in the county of Franklin and State of Ohio, have invented certain new and useful Improvements in Soap; and do hereby declare the following to be a full, clear, and exact description thereof.

The nature of our invention consists in a compound for soap, as will be hereinafter more fully set forth.

Our soap is composed of the following ingredients, in about the following proportions for one hundred pounds of soap: Tallow, twenty-two pounds; sal-soda, twenty-two pounds; rosin, fourteen pounds; fuller's-earth, five pounds; beef-gall, one-half pound; eggs, one-half dozen; potatoes, (peeled,) two pounds; and unslaked lime, five pounds, slaked in twenty quarts soft water.

The fuller's-earth is for the purpose of extracting grease and giving a hard body to the soap; beef-gall is for removing dirt and grease, and is also good for colored fabrics; the eggs clear the soap and make a good lather; and the potatoes give a toughness to the soap and prevent waste in water.

We do not confine ourselves to the precise proportions of the ingredients above mentioned, as they may be varied for different qualities of soap, or for other causes, if desired.

Having thus fully described our invention, what we claim as new, and desire to secure by Letters Patent, is—

The within-described compound for soap, composed substantially of the ingredients herein set forth.

ISAAC C. McDONALD.
JAS. HOAGLAND.

Witnesses:
JOSEPH DICK,
A. H. FRITCHEY.